US012700106B2

(12) United States Patent
Ramanathan et al.

(10) Patent No.: US 12,700,106 B2
(45) Date of Patent: Aug. 4, 2026

(54) REAL-MOTION PREDICTION

(71) Applicant: ObjectVideo Labs, LLC, Tysons, VA (US)

(72) Inventors: Narayanan Ramanathan, Chantilly, VA (US); Gang Qian, McLean, VA (US); Sravanthi Bondugula, Vienna, VA (US); Allison Beach, Leesburg, VA (US); Donald Gerard Madden, Columbia, MD (US)

( * ) Notice: Subject to any disclaimer, the term of this patent is extended or adjusted under 35 U.S.C. 154(b) by 436 days.

(21) Appl. No.: 18/228,880

(22) Filed: Aug. 1, 2023

(65) Prior Publication Data

US 2024/0046485 A1 Feb. 8, 2024

Related U.S. Application Data

(60) Provisional application No. 63/394,523, filed on Aug. 2, 2022.

(51) Int. Cl.
*G06T 7/11* (2017.01)
*G06T 5/70* (2024.01)
(Continued)

(52) U.S. Cl.
CPC ................ *G06T 7/248* (2017.01); *G06T 5/70* (2024.01); *G06T 7/11* (2017.01); *G06T 7/215* (2017.01);
(Continued)

(58) Field of Classification Search
CPC ...... G06V 10/62; G06V 10/764; G06V 10/82; G06V 20/52; G06T 2207/20081;
(Continued)

(56) References Cited

U.S. PATENT DOCUMENTS

2010/0177963 A1* 7/2010 Yokomitsu .............. B61L 23/00 382/170
2017/0236288 A1* 8/2017 Sundaresan ............. G06T 7/215 382/173

(Continued)

OTHER PUBLICATIONS

OpenCV [online], "Optical Flow," Available on or before Dec. 15, 2019, retrieved on Nov. 13, 2023, retrieved from URL<https://docs.opencv.org/3.4/d4/dee/tutorial_optical flow.html>, 5 pages.

(Continued)

*Primary Examiner* — Kenny A Cese
(74) *Attorney, Agent, or Firm* — Fish & Richardson P.C.

(57) ABSTRACT

Methods, systems, and apparatus, including computer programs encoded on computer storage media, for real-motion prediction. One of the methods includes: providing, as an input to a machine learning model, image frames of a scene for which the image frames were captured over a period of time; obtaining, as an output from the machine learning model, a temporally aggregated optical flow signature that includes a two-dimensional (2D) motion vector for a plurality of locations in the image frames of the scene; detecting, using the temporally aggregated optical flow signature, a real-motion event by comparing a magnitude of each 2D motion vector with a threshold; and performing an action for the real-motion event in response to detecting the real-motion event.

20 Claims, 4 Drawing Sheets

(51) Int. Cl.

| | |
|---|---|
| ***G06T 7/215*** | (2017.01) |
| ***G06T 7/246*** | (2017.01) |
| ***G06V 10/62*** | (2022.01) |
| ***G06V 10/764*** | (2022.01) |
| ***G06V 20/52*** | (2022.01) |
| *G06V 10/82* | (2022.01) |

(52) U.S. Cl.

CPC ............... *G06T 2207/20081* (2013.01); *G06T 2207/20084* (2013.01); *G06T 2207/30232* (2013.01); *G06V 10/62* (2022.01); *G06V 10/764* (2022.01); *G06V 10/82* (2022.01); *G06V 20/52* (2022.01)

(58) Field of Classification Search

CPC . G06T 2207/20084; G06T 2207/30232; G06T 5/70; G06T 7/11; G06T 7/215; G06T 7/248

See application file for complete search history.

(56) References Cited

U.S. PATENT DOCUMENTS

| | | | | |
|---|---|---|---|---|
| 2019/0138889 | A1* | 5/2019 | Jiang | H04N 7/0127 |
| 2020/0193609 | A1* | 6/2020 | Dharur | G06N 3/09 |
| 2021/0118153 | A1* | 4/2021 | Schmid | G06N 3/0895 |
| 2021/0166396 | A1* | 6/2021 | Chen | G06T 7/74 |
| 2023/0033989 | A1* | 2/2023 | Maurer | G06T 7/248 |
| 2023/0040565 | A1* | 2/2023 | Naslavsky | G06V 10/82 |

OTHER PUBLICATIONS

Dosovitskiy et al. "Flownet: Learning optical flow with convolutional networks," Proceedings of the IEEE international conference on computer vision, 2015, 9 pages.

Hochreiter et al., "Long short-term memory." Neural Computation, 1997, 9(8):1735-1780.

PCT International Search Report and Written Opinion in International Appln. No. PCT/US2023/071452, mailed on Dec. 13, 2023, 14 pages.

Teed et al., "Raft: Recurrent all-pairs field transforms for optical flow, " European conference on computer vision. Springer, Cham, 2020, 21 pages.

Wikipedia, "Horn-Schunck method," https://en.wikipedia.org/w/index.php?title=Horn-Schunck method&oldid=1072462986, Feb. 17, 2022, 2 pages.

Wikipedia, "OpenCV," https://en.wikipedia.org/w/index.php?title-OpenCV&oldid=1072564905, Feb. 18, 2022, 4 pages.

Wikipedia, "Optical flow," https://en.wikipedia.org/w/index.php?title=Optical_flow&oldid=1075679216, Mar. 7, 2022, 6 pages.

Chen et al., "Integral Optical Flow and its Application for Monitoring Dynamic Objects from a Video Sequence," Journal of Applied Spectroscopy, Apr. 18, 2017, 84(1):120-128.

Liu et al., "SelFlow: Self-Supervised Learning of Optical Flow," 2019 IEEE/CVF Conference on Computer Vision and Pattern Recognition (CVPR), Long Beach, CA, Jun. 16-20, 2019, pp. 4566-4575.

Ren et al., "A Fusion Approach for Multi-Frame Optical Flow Estimation, " Paper, Presented at 2019 IEEE Winter Conference on Applications of Computer Vision (WACV), Waikoloa, HI, Jan. 7-11, 2019, pp. 2077-2086.

Supplementary European Search Report in European Appln. No. 23850911.1, mailed on Oct. 20, 2025, 15 pages.

Tu et al., "A survey of variational and CNN-based optical flow techniques," Signal Processing: Image Communication, Dec. 12, 2018, 72(1):9-24.

Zhu et al., "Guided Optical Flow Learning," CoRR, submitted Feb. 8, 2017, arXiv:10702.02295v1, 5 pages.

* cited by examiner

200

Provide, as an input to a machine learning model, image frames of scene which image frames were captured over a period of time
202

Obtain, as an output from the machine learning model, a temporally aggregated optical flow signature that includes a two-dimensional motion vector for a plurality of locations in the image frames of the scene
204

Determine, using the temporally aggregated optical flow signature, whether a real-motion event is detected by comparing a magnitude of the 2D vector with a threshold
206

NO

YES

Perform an action for the real-motion event
208

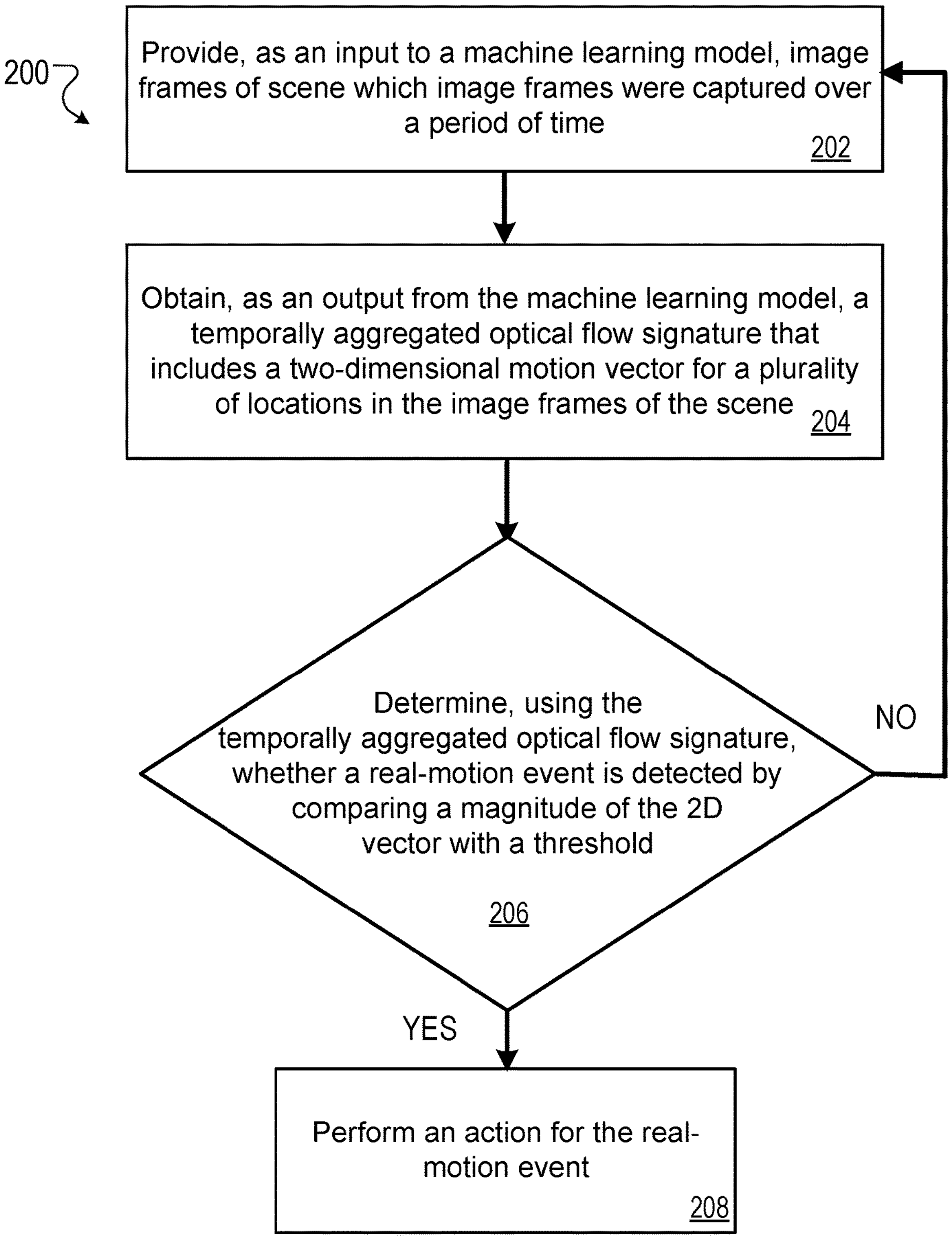

FIG. 2

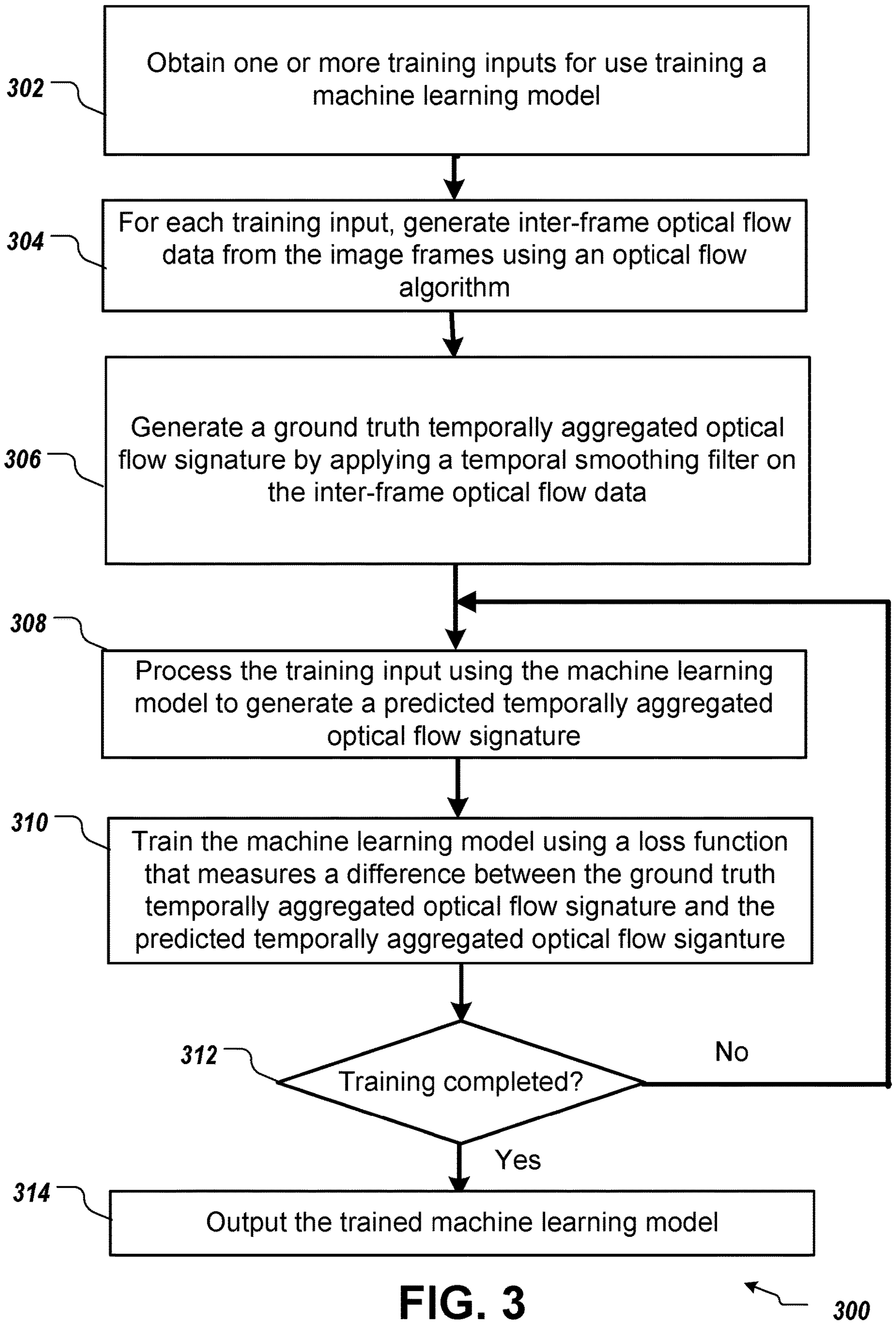

FIG. 3

302 — Obtain one or more training inputs for use training a machine learning model 304 — For each training input, generate inter-frame optical flow data from the image frames using an optical flow algorithm 306 — Generate a ground truth temporally aggregated optical flow signature by applying a temporal smoothing filter on the inter-frame optical flow data 308 — Process the training input using the machine learning model to generate a predicted temporally aggregated optical flow signature 310 — Train the machine learning model using a loss function that measures a difference between the ground truth temporally aggregated optical flow signature and the predicted temporally aggregated optical flow siganture 312 — Training completed?

No

Yes

314 — Output the trained machine learning model

FIG. 3     300

REAL-MOTION PREDICTION

CROSS-REFERENCE TO RELATED APPLICATION

This application claims the benefit of U.S. Provisional Application No. 63/394,523, filed on Aug. 2, 2022, which is incorporated herein by reference in its entirety.

BACKGROUND

This disclosure application relates generally to property monitoring systems.

A property monitoring system uses one or more cameras to continuously capture images or videos of a scene near a property, such as a house or a building. The property monitoring system performs analysis of the images or the videos of the scene and uses various computer vision methods to determine whether there is an object of interest or movement of an object of interest in the captured image or video. For example, the property monitoring system can detect pets, particular types of animals, people, and vehicles that exist or move in a captured video. When an object of interest is detected or a movement is detected, the property monitoring system can notify the owner of the property, e.g., sending a message to the owner of the property regarding suspicious movements of a person near a house. The property monitoring system can store one or more images or video clips that capture the object of interest or the movement of the object in a data storage system such that the owner of the property can review the images or the video clips at a later time.

SUMMARY

The disclosed systems and methods relate to detecting an event related to an object motion of interest in a scene by a property monitoring system. The property monitoring system can send an event notification to a user device or perform another appropriate action given the detected event.

One of the purposes of a property monitoring system is detecting events of interest in real-time and sending the user device an event notification. The events of interest can include one or more motions related to a set of pre-identified objects performing an activity. For example, the events of interest can include a person walking, opening a door, or picking up an object, a car moving through a scene, or an animal moving through a scene.

The events of interest can include motions related to undefined objects performing an unexpected or unusual activity. For example, the events of interest performed by the undefined objects can include a trash can getting blown away on a windy day, a tree branch falling on the driveway, or a downed electric pole. These undefined objects can refer to objects a user does not define, objects in categories the user does not define, or both.

Some property monitoring systems can detect motions related to a set of pre-identified objects or types of object, but can treat inanimate or undefined object motion as background information that is filtered out. These property monitoring systems can include object detectors or event detectors that are trained to not detect the inanimate or undefined object motion. For example, spurious events such as trees waving, plants shaking, or flags fluttering, e.g., with inclement weather conditions, can be determined as uninteresting and as background motions that are subtracted.

However, some types of inanimate or undefined object motions can be important for property monitoring and surveillance. Inanimate object motions of interest can include a trash can getting blown away on a windy day, a tree branch falling on the driveway, a trampoline in the backyard moving around in a manner that can pose danger if not addressed immediately, an entrance door or a garage door opening or closing, or a downed electric pole. Some property monitoring systems cannot detect these important events, e.g., when those systems only detect motions related to a set of pre-identified objects or types of objects. These important events can have strong relevance to property security, and event notifications and/or videos gathered on such events can be of high value for the user of the property monitoring system.

The disclosed systems and methods can detect motions pertaining to pre-defined objects of interest and important motions pertaining to inanimate or undefined objects, e.g., trash can getting blown away on a windy day, or tree branches falling on the driveway. The important motions pertaining to inanimate or undefined objects are the kind of motions that are related to undefined objects for which prior systems were not trained and actions were not performed. In some examples, the important motions can pertain to undefined objects that prior systems would not generate notifications for even though an intended recipient of such notifications might have acted on such notifications, e.g., a user may regret not having received event notifications for the motions of these undefined objects. The systems and methods can detect the important motions pertaining to the inanimate or undefined objects without requiring the user to define the objects or object categories that they are interested in. The systems and methods can detect these motions by calculating a temporally aggregated optical flow signature, e.g., a real-motion flow. The temporally aggregated optical flow signature can include spatial-temporally coherent motion and not include spurious motion.

In general, some aspects of the subject matter described in this specification can be embodied in methods that include the actions of providing, as an input to a machine learning model, image frames of a scene for which the image frames were captured over a period of time; obtaining, as an output from the machine learning model, a temporally aggregated optical flow signature that includes a two-dimensional (2D) motion vector for a plurality of locations in the image frames of the scene; detecting, using the temporally aggregated optical flow signature, a real-motion event by comparing a magnitude of each 2D motion vector with a threshold; and performing an action for the real-motion event in response to detecting the real-motion event.

Other implementations of these aspects include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. The real-motion event includes a spatiotemporally coherent motion of an inanimate or undefined object. Obtaining the temporally aggregated optical flow signature includes generating inter-frame optical flow data between two consecutive image frames in the image frames of the scene; and determining the temporally aggregated optical flow signature using a combination of the inter-frame optical flow data. The actions include computing a traversal score using a location of an object over the period of time. The actions include detecting one or more objects in the image frames including determining one or more locations and one or more object types of the one or more objects; determining that a region corresponding to the real-motion event does not overlap with the one or more locations of the one or more objects; and associating an undefined object type with the real-motion event. Performing the action for the real-motion event includes generating an event notification for the real-motion event.

In general, another aspects of the subject matter described in this specification can be embodied in methods that include the actions of obtaining one or more training inputs for use training a machine learning model configured to receive as an input, input image frames of an input scene and to process the input to generate a predicted temporally aggregated optical flow signature that includes a two-dimensional motion vector for a plurality of locations in the input image frames of the input scene, wherein each training input includes training image frames of a scene for which the training image frames were captured over a period of time; for each training input, generating inter-frame optical flow data from the training image frames using an optical flow algorithm; generating a ground truth temporally aggregated optical flow signature by applying a temporal smoothing filter on the inter-frame optical flow data, wherein the ground truth temporally aggregated optical flow signature includes a ground truth two-dimensional motion vector for a plurality of ground truth locations in the training image frames of the scene; and processing the training input using the machine learning model to generate a training predicted temporally aggregated optical flow signature; and training the machine learning model using a loss function that measures a difference between the ground truth temporally aggregated optical flow signature and the training predicted temporally aggregated optical flow signature.

Other implementations of these aspects include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. The one or more training inputs include images of spatiotemporally coherent motion of an inanimate or undefined object. For each training input, generating the ground truth temporally aggregated optical flow signature includes obtaining, using a semantic scene segmentation algorithm, one or more scene entities in each training input; determining that a first scene entity of the one or more scene entities has spatiotemporally coherent motion; and generating the ground truth temporally aggregated optical flow signature for the first scene entity using a real-motion flow vector of the first scene entity. The actions include determining that a second scene entity of the one or more scene entities has spurious motion; and setting the ground truth temporally aggregated optical flow signature for the second scene entity to zero. The actions include after training the machine learning model, providing, as a target input to the trained machine learning model, target image frames of a scene for which the target image frames were captured over a target period of time; obtaining, as a target output from the trained machine learning model, a target temporally aggregated optical flow signature that includes a target two-dimensional (2D) motion vector for a plurality of target locations in the target image frames of the scene; detecting, using the target temporally aggregated optical flow signature, a target real-motion event by comparing a magnitude of each 2D motion vector with a threshold; and performing an action for the target real-motion event in response to detecting the target real-motion event. The machine learning model includes (i) a base neural network, (ii) a first head to generate the training predicted temporally aggregated optical flow signature, and (iii) a second head to generate an object type of a detected real-motion event.

The subject matter described in this specification can be implemented in various embodiments and may result in one or more of the following advantages. In some implementations, the systems and methods can detect the real-motion flow using a machine learning model, e.g., a deep neural network, trained to take a set of video frames as input and generate as output, real-motion flow only on both motions pertaining to pre-defined objects of interest and important motions pertaining to inanimate or undefined objects. The machine learning model can be trained on a training dataset that includes real-motion flow data generated by applying a temporal smoothing filter on inter-frame optical flow data generated by an optical flow algorithm. Because the training dataset does not require manual annotation of the object types of the real-motion flow, a large amount of training data can be efficiently and automatically generated. Thus, the machine learning model can be trained on the large amount of training data to generate accurate predictions of the real-motion flow.

In some implementations, the systems and methods can detect the real-motion flow by applying a temporal smoothing filter on inter-frame optical flow data. Specialized hardware devices for optical flow computation can be used to generate the inter-frame optical flow data. In some implementations, the systems and methods can associate an object type with a detected real-motion flow. The object type can include a type of the pre-defined objects, e.g., person, car, animal (or a type of animal), and an object type "undefined" that corresponds to inanimate or undefined objects.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow chart illustrating an example of a process for detecting a real-motion event using a machine learning model.

FIG. 3 is a flow chart illustrating an example of a process for training a machine learning model for detecting a real-motion event.

Like reference numbers and designations in the various drawings indicate like elements.

DETAILED DESCRIPTION

Figure 1:
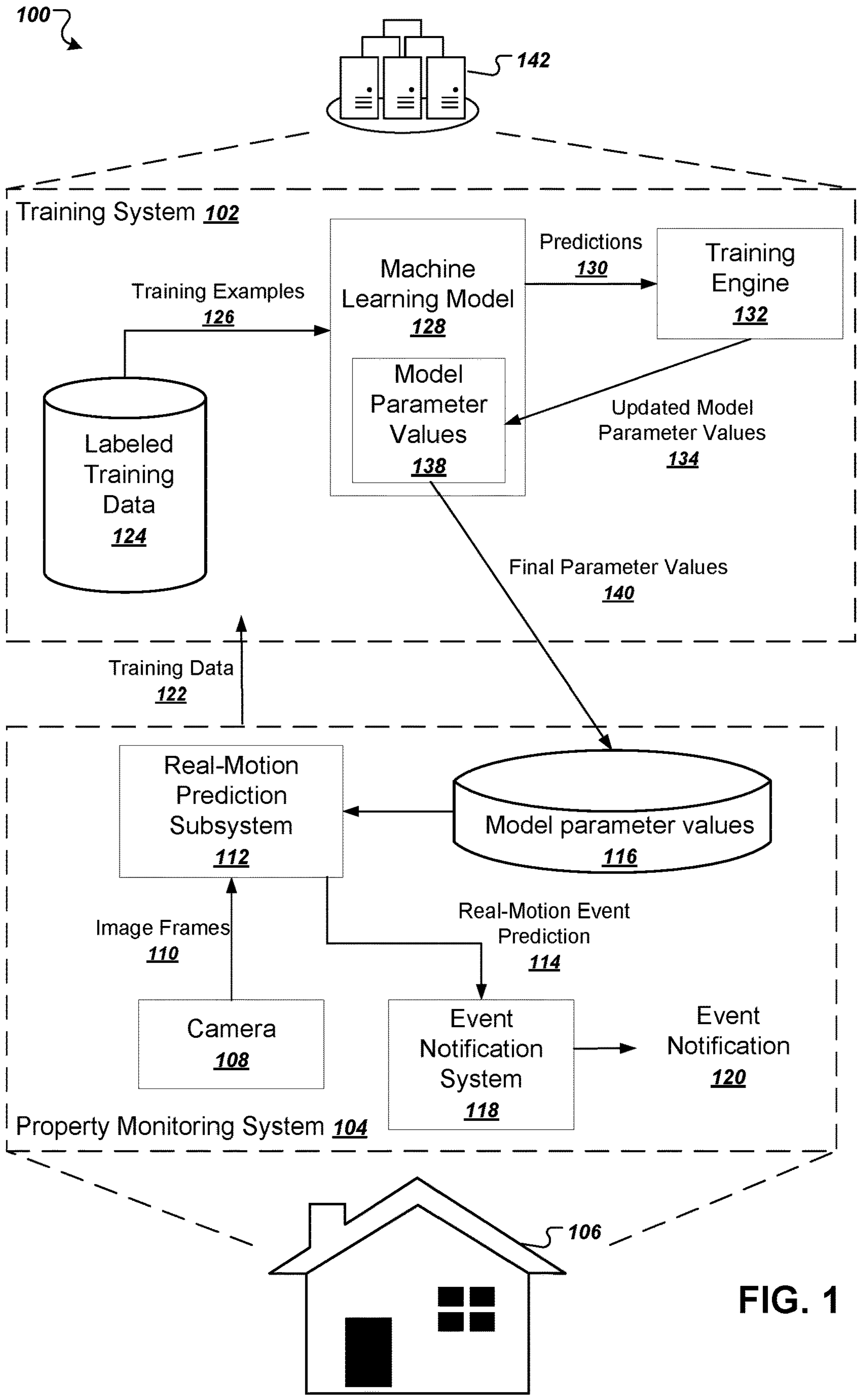
FIG. 1 is a diagram illustrating an example environment.

FIG. 1 is a diagram illustrating an example environment 100. The environment 100 includes a training system 102 and a property monitoring system 104. The environment 100 can be used to detect events of interest caused by undefined objects. An undefined object can be an object for which a model is not specifically trained by the training system 102.

The property monitoring system 104 uses one or more cameras 108 to continuously capture images of a scene near a property 106. The property 106 can be a residential property or a commercial property. The one or more cameras 108 can be a video or a photographic camera or other types of optical sensing device configured to capture images and videos. The one or more cameras 108 can be configured to capture images of an area near the property 106. The one or more cameras 108 can monitor the area within a field-of-view (FOV) of the one or more cameras 108. The one or more cameras 108 can be configured to capture single, static images of the area or videos of the area, such as the image frames 110. In some implementations, the property monitoring system 104 uses the one or more cameras 108 to continuously capture images or videos of the scene near the property 106. The image frames 110 can include the image frames of a scene which image frames were captured over a period of time.

The property monitoring system 104 includes a real-motion prediction subsystem 112 that can be configured to take the image frames 110 as input and to generate a real-motion event prediction 114. The real-motion event prediction 114 can include a predicted likelihood that a real-motion event has occurred in the scene depicted by the image frames 110. In some implementations, the real-motion event prediction 114 can include a location in the image frames 110 where the real-motion event occurs.

A real-motion event corresponds to spatiotemporally coherent motions of objects depicted in the image frames 110. Since a real-motion event corresponds to motion, the real-motion prediction subsystem 112 can require receipt of a sequence of image frames 110 as input in order to generate output, e.g., two or more image frames. A real-motion event can include i) motions of pre-defined objects of interest and ii) important motions of inanimate or undefined objects. A real-motion event does not include spurious motions such as trees waving, plants shaking, or flags fluttering.

The important motions of inanimate or undefined objects pertain to undefined objects that other systems likely would not generate notifications for even though an intended recipient of such notifications might have acted on such notifications, e.g., a user may regret not having received event notifications for the motions of these undefined objects. Examples of the important motions of inanimate or undefined objects can include a trash can getting blown away on a windy day, a tree branch falling on the driveway, a trampoline in the backyard moving around in a manner that can pose danger if not addressed immediately, an entrance door or a garage door opening or closing, or a downed electric pole.

The real-motion prediction subsystem 112 can generate a temporally aggregated optical flow signature, e.g., a real-motion flow, from the input image frames 110, and the subsystem 112 can use the temporally aggregated optical flow signature to generate the real-motion event prediction 114. Generally, optical flow is the apparent motion, e.g., velocity or other types of movement, of individual pixels on an image plane of an image. The optical flow can characterize the physical motion of objects projected onto the image plane. The optical flow can include a two-dimensional (2D) motion vector for the motion of each pixel in the image. The optical flow can be measured between two consecutive image frames or other image frames in a sequence. The temporally aggregated optical flow signature is computed over a set of image frames, e.g., 15 image frames, and can aggregate inter-frame optical flow data between two consecutive image frames over the set of image frames. The aggregate inter-frame optical flow data can be any appropriate combination of the optical flow data, such as an average, a sum, or a product.

The temporally aggregated optical flow signature can include a two-dimensional (2D) motion vector for a plurality of locations in the image frames of the scene depicted in the input image frames 110. For example, the input image frames 110 can include 10 grayscale images at a resolution of 240×352, and temporally aggregated optical flow signature can be a matrix of size 240×352×2, including the magnitude of the temporally aggregated optical flow along the x direction and the magnitude along the y direction for each pixel (Xi, Yi) in the image frames. Here, Xi and Yi are the image coordinate of the pixels in the image frames.

A magnitude of the aggregated optical flow signature can represent a type of motion. Spatiotemporally coherent motion can have a stronger temporally aggregated optical flow signature, e.g., with a higher magnitude of the 2D motion vector. In contrast, spurious motion can have a weaker temporally aggregated optical flow signature, e.g., with a lower magnitude of the 2D motion vector. The real-motion prediction subsystem 112 can use the temporally aggregated optical flow signature to detect a real-motion event by comparing a magnitude of each 2D motion vector with a threshold. A system can determine that magnitudes that satisfy the threshold, e.g., are greater than or equal to or either, likely represent motion and data for the motion should be maintained. The system can determine that magnitudes that do not satisfy the threshold, e.g., are less than or equal to or either, do not likely represent relevant motion and that data for the motion should not be maintained. Thus, using the real-motion flow, the real-motion prediction subsystem 112 can retain the spatiotemporally coherent motion, e.g., including the important motions of defined and undefined objects, and can discard the spurious motions.

For example, an object's voluntary motion, e.g., a person walking, or involuntary motion, e.g., a trash can being blown away, or pre-programmed motion, e.g., a garage door opening, can result in a series of sub-events in which the object traverses through the scene in a spatiotemporally coherent fashion. On the contrary, a spurious motion, e.g., a waving tree branch, a waving flag, a hanging holiday lights, does not result in traversal characteristics, e.g., has a magnitude within a threshold distance of zero. Although the frame-to-frame optical flow of a spurious motion may be significant, the real-motion flow of a spurious motion can have a low magnitude, e.g., within a threshold distance from zero, because the temporally aggregated optical flow signature over multiple frames cancels out the frame-to-frame optical flows.

In some implementations, the real-motion prediction subsystem 112 can compute a traversal score of an object's location over time. When x1, x2, . . . , xN correspond to an object's location over time, a system can determine the traversal score Ts using equation (1), below.

$$Ts=|xN-x1|/(|x2-x1|+|x3-x2|+\ldots+|xN-x(N-1)|) \quad (1)$$

In equation (1), the operation 1.1 corresponds to the L1 norm or the L2 norm. For objects that are getting displaced over the period of time, the traversal score can be within a first threshold distance from 1. For objects that are moving but not getting displaced, the traversal score can be within a second threshold distance from 0. The temporally aggregated optical flow signature, e.g., the real-motion flow, generated by the real-motion prediction subsystem 112 can capture the traversal characteristics of non-spurious motions and spurious motions.

The real-motion prediction subsystem 112 can generate a temporally aggregated optical flow signature over a period of time using input image frames 110 over the period of time. For example, the period of time can be between 2 seconds and 5 seconds. The length of the period of time can be predetermined, can be determined according to the scene depicted in the image frames 110, or a combination of both.

In some implementations, the period of time can have a minimum length, e.g., 2 seconds, because some spurious motion can be slow. For example, a waving flag can move in one direction over 1 second, but may not move in one direction over 2 seconds. If the one or more cameras 108 capture the image frames over 2 seconds or 3 seconds, the image frames 110 can likely capture motions that are back and forth.

In some implementations, the system 104 can determine a number of the image frames 110 that depicts a scene over a period of time and determine the length of the period of time using the number of image frames 110. The one or more cameras 108 can provide N image frames to the real-motion prediction subsystem 112. For example, the one or more cameras 108 can provide 10 images at 5 frames per second. Thus, the 10 images can cover a 2 seconds period of time. In some examples, the one or more cameras 108 can provide 15 images at 5 frames per second. Thus, the 15 images can cover a 3 seconds period of time, providing more context information to the real-motion prediction subsystem 112.

In some implementations, the system 104 can select the image frames 110 by sampling the images captured by the one or more cameras 108. For example, if the camera frame rate is 24 frames per second, the system 104 can sample the images at 3 frames per second evenly. Thus, the system can obtain 15 image frames over a 5 seconds period of time and provide the 15 image frames as input to the real-motion prediction subsystem 112.

In some implementations, the real-motion prediction subsystem 112 can generate the temporally aggregated optical flow signature by applying a temporal smoothing filter on inter-frame optical flow data. The subsystem 112 can use specialized hardware devices for optical flow computation to generate the inter-frame optical flow data. For example, specialized chips for optical flow computation can generate the inter-frame optical flow data. The temporal smoothing filter can aggregate the inter-frame optical flow data over multiple image frames. For example, the temporal smoothing filter can be a sliding window that aggregates the flow vectors of the inter-frame optical flow data over the multiple image frames. Because the specialized hardware devices for optical flow computation can be inexpensive, consume less power and computational resources, or both, the property monitoring system 104 can include the real-motion prediction subsystem 112 as a low-cost system implemented on-the-edge at the property 106.

In some implementations, the real-motion prediction subsystem 112 can generate the temporally aggregated optical flow signature using a machine learning model included in the real-motion prediction subsystem 112. The subsystem 112 can provide, as an input to the machine learning model, data for the image frames 110 of the scene which image frames were captured over a period of time. The subsystem 112 can obtain, as an output from the machine learning model, the temporally aggregated optical flow signature.

In some implementations, the machine learning model can be a neural network model, such as convolutional neural networks, long-short term memory (LSTM) neural networks, a Flow-Net neural network, a Recurrent All-Pairs Field Transforms (RAFT) neural network, etc. The real-motion prediction subsystem 112 can implement the operations of each layer of a neural network model. In some implementations, the neural network model can be a deep neural network model that has many neural network layers.

The machine learning model can be trained to generate the temporally aggregated optical flow signature from the image frames 110. In some implementations, the machine learning model can be trained to generate a real-motion event prediction 114 from the image frames 110. More details regarding training the machine learning model is discussed in connection with FIG. 3, below.

The real-motion prediction subsystem 112 can implement operations of the machine learning model by loading a collection of model parameter values 116 of the machine learning model received from the training system 102. Although illustrated as being logically separated, the model parameter values 116 and the software or hardware modules performing the operations of the machine learning model may actually be located on the same computing device or, in the case of an executing software module, stored within the same memory device, as the real-motion prediction subsystem 112.

The real-motion prediction subsystem 112 can use hardware acceleration or other special-purpose computing devices to implement the operations of one or more layers of the machine learning model. For example, some operations of some layers of a neural network model may be performed by highly parallelized hardware, e.g., by a graphics processing unit (GPU) or another kind of specialized computing device. The one or more GPUs or other specialized computing devices can perform operations in conjunction with one or more central processing units (CPUs) included in the real-motion prediction subsystem 112.

The subsystem 112 can determine one or more regions in the image frames 110 that include a real-motion event by comparing the magnitude of each 2D motion vector of the one or more regions with a threshold value. The subsystem 112 can determine a likely real-motion event if the magnitude of each 2D motion vector of the one or more regions satisfies a criterion, e.g., is larger than the threshold value. When the region satisfies the criterion, the subsystem 112 can determine that the region likely corresponds to a real-motion event.

The threshold value can be predetermined by the system 104, by user input, by the training system 102, or by another appropriate system or device. In some implementations, the threshold value can be adjusted in response to user input, the specific scene captured by the image frames, or both. For example, user devices can receive input from corresponding users which specifies the threshold value to have a more sensitive real-motion monitoring subsystem or a less sensitive real-motion monitoring subsystem. In some examples, a user or a system, or a combination of both, can define different threshold values for different scenes, e.g., front door, front yard, driveway, back yard, etc.

In some implementations, the system 104 can compare each of the one or more regions with a location of an object of interest detected in the image frames. The system 104 can use an object detector to detect whether a predefined object exists in the image frames and can determine an object type of the detected object. If a region with a predicted real-motion event overlaps with the location of a detected object, the system 104 can associate the object type of the detected object with the predicted real-motion event. The object type can include a type of the pre-defined objects, e.g., person, car, animal (or a type of an animal). If a region does not overlap with any of the detected objects, the system 104 can associate an object type with the predicted real-motion event, and the object type can be "undefined", indicating inanimate or undefined objects.

After determining the real-motion event prediction 114, the property monitoring system 104 can perform an action for the real-motion event. In some implementations, the real-motion prediction subsystem 112 can provide the real-motion event prediction 114 to an event notification system 118. The event notification system 118 can generate an event notification 120 and can provide the event notification 120 to a user device. A user of the user device can receive the event notification 120 and can take actions in response to the real-motion event.

In some implementations, the event notification system 118 can determine whether the location of the predicted real-motion event is within an area-of-interest. User devices can receive input from corresponding users which defines the area-of-interest. For example, a user device can provide information indicating that a driveway area is an area-of-interest. If the event notification system 118 determines that the location of the predicted real-motion event fell within the area-of-interest, e.g., having a sufficient overlap with the area-of-interest, the event notification system 118 can send an event notification 120 to a user device, can save the image frames 110 corresponding to the predicted real-motion event in a computer, or both. If the event notification system 118 determines that the location of the predicted real-motion event does not fell within the area-of-interest, e.g., having an insufficient overlap with the area-of-interest, the event notification system 118 may not send an event notification 120 to a user device, or may not save the image frames 110 in a computer, or both.

The property monitoring system 104 can use the image frames 110 generated by the one or more cameras 108 to generate training data 122. The training data 122 can be used to train a machine learning model 128 that will later be used by the real-motion prediction subsystem 112 to generate a real-motion event prediction 114. The property monitoring system 104 can provide the training data 122 to the training system 102 in offline batches or in an online fashion, e.g., continuously whenever it is generated.

The training system 102 can be hosted within a data center 142, which can be a distributed computing system having hundreds or thousands of computers in one or more locations.

The training system 102 includes a machine learning model 128 that is configured to generate a prediction 130, e.g., a predicted temporally aggregated optical flow signature, from each of the training examples 126. The training system 102 includes a plurality of computing devices having software or hardware modules that implement the respective operations of the machine learning model 128, e.g., each layer of a neural network model according to an architecture of the neural network model.

The training machine learning model 128 generally has the same architecture and parameters as the machine learning model used by the property monitoring system 104. However, the training system 102 does not need to use the same hardware to compute the operations of the machine learning model. In other words, the training system 102 can use CPUs only, highly parallelized hardware, or some combination of these.

The training system 102 can compute the operations of the machine learning model 128 using current parameter values stored in a collection of model parameter values 138. The model parameter values 138 and the software or hardware modules performing the operations may actually be located on the same computing device or on the same memory device.

The training machine learning model 128 can receive training examples 126 as input. The training examples 126 can be labeled training data 124 that is stored in a database. Each training example includes a plurality of image frames and a ground truth temporally aggregated optical flow signature. The ground truth temporally aggregated optical flow signature can include a ground truth two-dimensional (2D) motion vector for a plurality of locations in the image frames.

For example, for a training example, the plurality of image frames can include a set of consecutive image frames over a duration of 1 second, 2 seconds, or more. The ground truth temporally aggregated optical flow signature can indicate motions of pre-defined objects and important motions of inanimate or undefined objects. Thus, the machine learning model 128 can be trained to detect object motion or scene entity motion that are deemed important, e.g., spatiotemporally coherent motions, and can be trained to suppress spurious motions.

In some implementations, the training system 102 can generate the ground truth temporally aggregated optical flow signature by applying a temporal smooth filter on inter-frame optical flow data. The training system 102 can generate inter-frame optical flow data from the image frames using an optical flow algorithm. For example, the training system 102 can generate an estimated optical flow between each of the two consecutive frames of the image frames using OpenCV. The training system 102 can apply a box smoothing filter on the inter-frame optical flow data. The box smoothing filter can take the optical flow vector at a location, e.g., a pixel (x, y), in the image frames as input, and can apply the smoothing of the magnitude and direction of the optical flow vector over a period of time.

The training system 102 can generate, for each training example 123, a prediction 130. Each prediction 130 represents a predicted temporally aggregated optical flow signature generated by the machine learning model 128. A training engine 132 analyzes the predictions 130 and compares the predictions 130 to the labels (e.g., the ground truth temporally aggregated optical flow signature) in the training examples 123 using a loss function, e.g., a regression loss function. The training system 102 can train the machine learning model 128 using the loss function that measures a difference between the ground truth temporally aggregated optical flow signature and the predicted temporally aggregated optical flow signature. The training engine 132 then generates updated model parameter values 134 using an appropriate updating technique, e.g., stochastic gradient descent with backpropagation. The training engine 132 can then update the collection of model parameter values 138 using the updated model parameter values 134.

After training is complete, the training system 102 can provide a final set of model parameter values 140 to the property monitoring system 104 for use in making real-motion event predictions. For example, the training system 102 can provide a final set of model parameter values 140 to the real-motion prediction subsystem 112 that implements the operations of the machine learning model to generate temporally aggregated optical flow signatures of image frames 110 and to generate real-motion event predictions 114. The training system 102 can provide the final set of model parameter values 140 by a wired or wireless connection to the property monitoring system 104.

The property monitoring system 104 and the training system 102 are examples of a system implemented as computer programs on one or more computers in one or more locations, in which the systems, components, and techniques described in this specification are implemented. The network (not shown), such as a local area network ("LAN"), wide area network ("WAN"), the Internet, or a combination thereof, connects the training system 102 and the property monitoring system 104. The property monitoring system 104, the training system 102, or a both, can use a single server computer or multiple server computers operating in conjunction with one another, including, for example, a set of remote computers deployed as a cloud computing service.

The property monitoring system 104, the training system 102, or both can include several different functional components, including a real-motion prediction subsystem 112, a training engine 132, and a machine learning model 128. The real-motion prediction subsystem 112, the training engine 132, or the machine learning model 128, or a combination of these, can include one or more data processing apparatuses, can be implemented in code, or a combination of both. For instance, each of the real-motion prediction subsystem 112, the training engine 132, and the machine learning model 128, can include one or more data processors and instructions that cause the one or more data processors to perform the operations discussed herein.

The various functional components of the property monitoring system 104, the training system 102, or both, can be installed on one or more computers as separate functional components or as different modules of a same functional component. For example, the components including the real-motion prediction subsystem 112, the training engine 132, and the machine learning model 128 of the property monitoring system 104, the training system 102, or both, can be implemented as computer programs installed on one or more computers in one or more locations that are coupled to each through a network. In cloud-based systems for example, these components can be implemented by individual computing nodes of a distributed computing system.

FIG. 2 is a flow chart illustrating an example of a process 200 for detecting a real-motion event using a machine learning model. The process 200 can be performed by one or more computer systems, for example, the property monitoring system 104, the real-motion prediction subsystem 112, or a combination of these. In some implementations, some or all of the process 200 can be performed by a property monitoring system 104 located at the property 106, or by another computer system located at another location.

The system provides, as an input to a machine learning model, image frames of a scene which image frames were captured over a period of time (202). The image frames can include a set of grayscale images, or a set of RGB images. For example, the image frames can include 10 grayscale images at a resolution of 240×352, with a frame rate of 5 frames per second. Thus, the image frames cover a period of two seconds. The image frames can be captured by a single camera or multiple cameras of the property monitoring system.

The system obtains, as an output from the machine learning model, a temporally aggregated optical flow signature that includes a two-dimensional (2D) motion vector for a plurality of locations in the image frames of the scene (204). In some implementations, the system can generate inter-frame optical flow data between two consecutive image frames in the image frames of the scene, and can determine the temporally aggregated optical flow signature using a combination of the inter-frame optical flow data.

For example, each 2D motion vector can include the magnitude of the 2D motion vector in the x direction and the magnitude of the 2D motion vector in the y direction. The temporally aggregated optical flow signature, e.g., the real-motion flow, can characterize spatiotemporally coherent motions and suppress spurious motions.

For example, the input image frames can include 10 grayscale images at a resolution of 240×352, and the input to the machine learning model can be a matrix of size 240×352×10. The output temporally aggregated optical flow signature from the machine learning model can be a matrix of size 240×352×2, including the magnitude of the temporally aggregated optical flow along the x direction and the magnitude along the y direction. Here, x and y are the image coordinates in the image frames.

In some implementations, the system can receive a stream of images captured by the camera and can determine the input image frames to the machine learning model using a sliding window. If the overall computation cost of detecting a real-motion event is low, the system can sample the image frames more frequently. If the overall computation cost of detecting a real-motion event is high, the system can sample the image frames less frequently. For example, if the overall computation cost of detecting a real-motion event is low, the system can perform the process 200 for detecting a real-motion event for 15 image frames, at the 0-15 frames, the 1-16 frames, and the 2-17 frames, etc. If the overall computation cost of detecting a real-motion event is high, the system can perform the process 200 for detecting a real-motion event every 1 second. The system can process the most recent image frames over the past 3 seconds. Thus, for a frame rate of 5 frames per second, the system can perform the process 200 for detecting a real-motion event for 15 image frames, at the 0-15 frames, the 5-20 frames, and the 10-25 frames, etc.

The system determines, using the temporally aggregated optical flow signature, whether a real-motion event is detected by comparing a magnitude of the 2D vector with a threshold (206). In some implementations, the real-motion event can include motions of pre-defined objects. In some implementations, the real-motion event can include a spatiotemporally coherent motion of an inanimate or undefined object. For example, the real-motion event can include motions of inanimate or undefined objects that are important for property monitoring and surveillance. Examples of motions of inanimate or undefined objects include trash can getting blown away on a windy day, tree branch falling on the driveway, trampoline set up in the backyard moving around in a manner that can pose dangers if not addressed immediately, entrance door opening, garage door opening, electric poles falling down, etc. Such events can have strong relevance to the security of the property that is being monitored. Videos or images of such events can be of high value for a user of the property monitoring system.

In some implementations, user devices can receive input from corresponding users which specifies the threshold that can adjust the sensitivity of the detection of the real-motion events. In some environments, it can be desirable to receive more alerts, less alerts, or no alerts. The system allows a user to adjust the threshold before or while the system is running the real-motion event detection. For example, it can be desirable to receive an alert about a person getting to the front door, and it can be less desirable to receive an alert about a person standing at a front door waiting for the door to open. In some examples, it can be important to detect a real-motion event related to plants falling down on the ground. The system or a user device can receive an input that can adjust the threshold accordingly.

In some implementations, the system can detect a real-motion event without performing object detections for pre-defined objects. The system can obtain a temporally aggregated optical flow signature from the image frames of the scene and can determine a real-motion event by comparing a magnitude of the 2D vector of the temporally aggregated optical flow signature with a threshold. The temporally aggregated optical flow signature can capture the real-motion flow of all the objects and scene events in the image frames, including motions of the pre-defined objects and non-spurious motions of inanimate or undefined objects.

In some implementations, the system can determine the object type that is associated with a real-motion event. In some implementations, the system can detect one or more objects in the image frames, including determining one or more locations and one or more object types of the one or more objects. The system can determine that a region corresponding to the real-motion event does not overlap with the one or more locations of the one or more objects, and the system can associate an undefined object type with the real-motion event.

For example, after the system determines a spatiotemporally coherent motion, the system can determine the object associated with the motion. In some examples, the system can include an object detection model, e.g., a machine learning model, to detect locations of pre-defined objects, and can determine the object type of the detected objects. The system can determine whether the real-motion event corresponds to a detected object by comparing the object locations with the locations of motion vectors in the real-motion event. If the real-motion event corresponds to a detected object, the system can determine the object type of the real-motion event using the object type of the detected object.

In some implementations, the system can add a submodule to the machine learning model, e.g., adding a head to a neural network model. This can occur after the machine learning model is trained, e.g., as described with reference to FIG. 3. The submodule can be trained to generate an object type of a detected real-motion event. For example, the machine learning model can include a head to generate the object type, e.g., 0 for person, 1 for vehicle, 2 for animal, 3 for unknown objects, and a head to generate the temporally aggregated optical flow signature. The two heads can share the same base neural network. The system can generate both the temporally aggregated optical flow signature and the object type of the detected real-motion event. The system does not need a standalone object detector, a standalone object tracker, or both.

If the system does not detect a real-motion event, the system can perform analysis on additional image frames or new image frames captured over a future time period.

In some implementations, the system can compute a traversal score using a location of an object over the period of time.

If the system detects a real-motion event, the system performs an action for the real-motion event (208). In some implementations, the system can generate an event notification for the real-motion event. In some implementations, the system can send a notification to a user device and the notification can include data corresponding to the real-motion event. For example, the system can generate an alert that includes a message of "Motion detected, person entering/leaving" if the system detects a real-motion event of a person entering or leaving. In some examples, the system can generate an alert that includes a message of "Motion detected, unknown object type" if the system detects a real-motion event of an undefined object.

In some implementations, the system can determine the motion direction of the real-motion event using the motion vectors in the temporally aggregated optical flow signature. For example, the system can determine whether the person is entering or leaving using the direction of the motion vectors corresponding to the person in the temporally aggregated optical flow signature.

In some implementations, a user device can receive the alert or notification and can display the alert or notification to a user of the user device. For example, after getting an alert about a likely real-motion event with an "unknown object type", the user can immediately review the notification and inspect the situation near the property. In some examples, after receiving an alert about a likely real-motion event with an "unknown object type", the user can review the video clip saved in a computer server of the property monitoring system and can determine that the real-motion event is a falling tree branch.

In some implementations, the system can save videos, images, or both, related to, e.g., depicting, the real-motion event to a computer of the property monitoring system. In some implementations, the system can turn on the lights of an area that corresponds to the real-motion event. The detected real-motion event not only generates non-spurious motion that is deemed important, but it can automatically localize where the motion is located in the image frames of the scene using the magnitude of the motion vector in the temporally aggregated optical flow signature. In some implementations, the system can receive an area-of-interest and can compare the location of the detected real-motion event with the area-of-interest. The system can perform an action for the real-motion event only if the real-motion event falls within an area-of-interest.

The order of operations in the process 200 described above is illustrative only, and operations can be performed in different orders. In some implementations, the process 200 can include additional operations, fewer operations, or some of the operations can be divided into multiple operations.

FIG. 3 is a flow chart illustrating an example of a process 300 for training a machine learning model for detecting a real-motion event. The process 300 can be performed by one or more computer systems, for example, the training system 102, the training engine 132, or a combination of these.

The system obtains one or more training inputs for use training a machine learning model (302). The machine learning model can be configured to receive as an input, input image frames of an input scene and to process the input to generate a predicted temporally aggregated optical flow signature that includes a two-dimensional motion vector for a plurality of locations in the input image frames of the input scene. Each training input includes training image frames of a scene for which the training image frames were captured over a period of time. The training image frames can include videos or images of an indoor scene, an outdoor scene, at day time, at night time, a wide space captured by several cameras, or a narrow space captured by a single camera, or a combination of these. In some implementations, the training image frames can include images captured by an infrared camera.

In some implementations, the one or more training inputs can include images of spatiotemporally coherent motion of an inanimate or undefined object. For example, some training image frames can include images of object motions, including motions of pre-defined objects, e.g., people and vehicles, and important motions of undefined objects, e.g., trash can getting blown away and tree branches falling on the driveway. Some training image frames can include images of a scene with little or no motion. Some training image frames can include spurious motions of undefined objects, e.g., trees waving or flags fluttering.

For each training input, the system generates inter-frame optical flow data from the training image frames using an optical flow algorithm (304). For example, the system can generate inter-frame optical flow data using OpenCV.

The system generates a ground truth temporally aggregated optical flow signature (306). The system can generate the ground truth temporally aggregated optical flow signature by applying a temporal smoothing filter on the inter-frame optical flow data. The ground truth temporally aggregated optical flow signature can include a ground truth two-dimensional motion vector for a plurality of locations in the training image frames of the scene. The ground truth temporally aggregated optical flow signature can include optical flow signature of motions of pre-defined objects and non-spurious undefined objects.

For example, the system can aggregate the inter-frame optical flow data for each training input over a period of time using a temporal smoothing filter, e.g., a box smoothing filter. For each corresponding pixel in the training input, the system can obtain all the inter-frame optical flow vectors at the pixel and can compute an average of the inter-frame optical flow vectors over the time period. Because the training dataset does not require manual annotation of the ground truth temporally aggregated optical flow signature or the ground truth object types of the real-motion flow, a large amount of training data can be efficiently and automatically generated. Thus, the machine learning model can be trained on the large amount of training data to generate accurate predictions of the real-motion flow.

In some implementations, the system can generate the ground truth temporally aggregated optical flow signature by aggregating the inter-frame optical flow data in the spatial direction. For example, the system can trace a trajectory of each pixel and can compute a traversal score of each pixel. The traversal score of each pixel can be included in the ground truth temporally aggregated optical flow signature.

In some implementations, the system can determine the ground truth temporally aggregated optical flow signature for motions of pre-defined objects by comparing the aggregated inter-frame optical flow data with ground truth locations, e.g., bounding boxes, of pre-defined objects in the training input. The system can obtain the ground truth locations of the pre-defined objects from labels of the training input, e.g., data annotations by a human labeler or an algorithm.

In some implementations, the system can include the optical flow vectors that have a significant overlap with the ground truth locations of pre-defined objects in the ground truth temporally aggregated optical flow signature. In some implementations, the system can use a blob analyzer to group the optical flow vectors that satisfy a criterion, e.g., larger than a threshold. For example, the blob analyzer can include a connect component analysis algorithm that groups pixels that satisfy the criterion and that are adjacent, e.g., horizontally, vertically, diagonally, or a combination of these directions. The system can use the blob analyzer to generate a blob including the pixels that might have real non-spurious motions. In some implementations, the system can compute the size of the blob. If the size of the blob does not satisfy a criteria, e.g., if the size of the blob is too small, the system can discard the blob and may set the optical flow vectors of the blob to be zeros in the ground truth temporally aggregated optical flow signature.

In some implementations, the system can compute an overlap between the blob and a ground truth bounding box of a labeled object, e.g., by computing an intersection-over-union (IoU) score. If the IoU score satisfies a criteria, e.g., larger than a threshold, the system can determine that the blob has significant overlap with the labeled object, and the system can add the optical flow vectors of the blob to the ground truth temporally aggregated optical flow signature. If the IoU score does not satisfy the criteria, e.g., not larger than a threshold, the system can determine that the blob does not have significant overlap with the labeled object, and the system may not add the optical flow vectors of the blob to the ground truth temporally aggregated optical flow signature, or the system may set the optical flow vectors of the blob as zero in the ground truth temporally aggregated optical flow signature.

For example, real-motion flow obtained on a moving person can be retained in the ground truth temporally aggregated optical flow signature, and real-motion flow obtained on a waving flag or a waving tree branch can be set to zero in the ground truth temporally aggregated optical flow signature. Thus, the machine learning model can be trained to predict a real-motion event on motions of objects of interest.

In some implementations, the system can determine the ground truth temporally aggregated optical flow signature for important non-spurious motions of inanimate or undefined objects. In some implementations, the system can obtain, using a semantic scene segmentation algorithm, one or more scene entities in each training input. The system can determine that a first scene entity of the one or more scene entities has spatiotemporally coherent motion. The system can generate the ground truth temporally aggregated optical flow signature for the first scene entity using a real-motion flow vector of the first scene entity.

For example, the system can use a semantic scene segmentation algorithm to process the training image frames to obtain one or more scene entities in the training input. The system can label the pixels of the training image frames by scene entity, e.g., using a scene segmentation algorithm. Examples of scene entities can include road, grass, tree, table, chair, deck, sidewalk, wall, etc. The system can determine whether a scene entity corresponds to a high traversal score. If the system determines that a scene entity corresponds to a high traversal score, the system can determine that the scene entity has non-spurious or important motion. The system can include the corresponding real-motion flow vectors into the ground truth temporally aggregated optical flow signature.

In some implementations, the system can determine the ground truth temporally aggregated optical flow signature for spurious motions. In some implementations, the system can determine that a second scene entity of the one or more scene entities has spurious motion, and the system can set the ground truth temporally aggregated optical flow signature for the second scene entity to zero. In some implementations, the system can obtain image frames of a scene in an inclement weather condition, e.g., with rain, snow, wind, moving spider-web, etc. For example, the system can obtain image frames of a front yard of a house under a windy weather condition. The system can obtain multiple sets of image frames as training inputs and can set the ground truth temporally aggregated optical flow signature, e.g., the real-motion flow, for those sets of image frames to 0.

In some implementations, the system can generate training inputs that simulate instances of extreme weather conditions, e.g., excessive rain, excessive snow, excessive wind, excessive spider-web motion, etc., by taking sets of consecutive image frames at different frame rates. For example, the system can skip every other frame or every 2 frames when generating the training input that includes a set of image frames to simulate faster wind, heavier snow, or heavier rain.

In some implementations, the system can determine the length of the temporal smoothing filter using the urgency of the real-motion event. For example, if alerts need to be given instantly, the system can select a smoothing filter with a shorter time window, e.g., 2 seconds, and the system can train the machine learning model to detect the real-motion event from input image frames over a shorter period of time. In some examples, if alerts do not need to be given instantly or if no alerts need to be given and video clips are recorded, the system can select a smoothing filter with a longer time window, e.g., 5 seconds, and the system can train the machine learning model to detect the real-motion event from input image frames over a longer period of time, resulting in more reliable results.

The system processes the training input using the machine learning model to generate a training predicted temporally aggregated optical flow signature (308). The system trains the machine learning model using a loss function that measures a difference between the ground truth temporally aggregated optical flow signature and the training predicted temporally aggregated optical flow signature (310). For example, the loss function can be a regression loss that measures a difference between the magnitudes of the 2D motion vectors in the x direction and in the y direction. The system can generate updated model parameter values of the machine learning model using an appropriate updating technique, e.g., stochastic gradient descent with backpropagation.

In some implementations, the machine learning model can include (i) a base neural network, (ii) a first head to generate the training predicted temporally aggregated optical flow signature, and (iii) a second head to generate an object type of a detected real-motion event. For example, the machine learning model can include a head to generate the object type, e.g., 0 for person, 1 for vehicle, 2 for animal, 3 for unknown objects, and a head to generate the temporally aggregated optical flow signature, and the two heads can share the same base neural network. The system can train the machine learning model using a first loss function that measures a difference between the ground truth temporally aggregated optical flow signature and the predicted temporally aggregated optical flow signature, and a second loss function that measures a difference between a predicted object type and a ground truth object type label. The system can obtain the ground truth object type label from annotations of the training image frames.

The system determines whether the training is completed (312). In some implementations, the system can predetermine a number of iterations for the updates of the parameters of the machine learning model. In some implementations, the system can compare the magnitude of the parameter updates to a threshold, and if the magnitude of the parameter updates satisfies a criteria, e.g., smaller than the threshold, the system can determine that the training is completed. If the system determines that the training is not completed, the system can train the machine learning model using additional training data, can train the machine learning model for more iterations using the same training data, or both.

If the system determines that the training is completed, the system can output the trained machine learning model (314). For example, the system can provide the final parameters values 140 of the machine learning model to a property monitoring system 104 that performs real-motion event detections.

The order of operations in the process 300 described above is illustrative only, and operations can be performed in different orders. In some implementations, the process 300 can include additional operations, fewer operations, or some of the operations can be divided into multiple operations.

Figure 4:
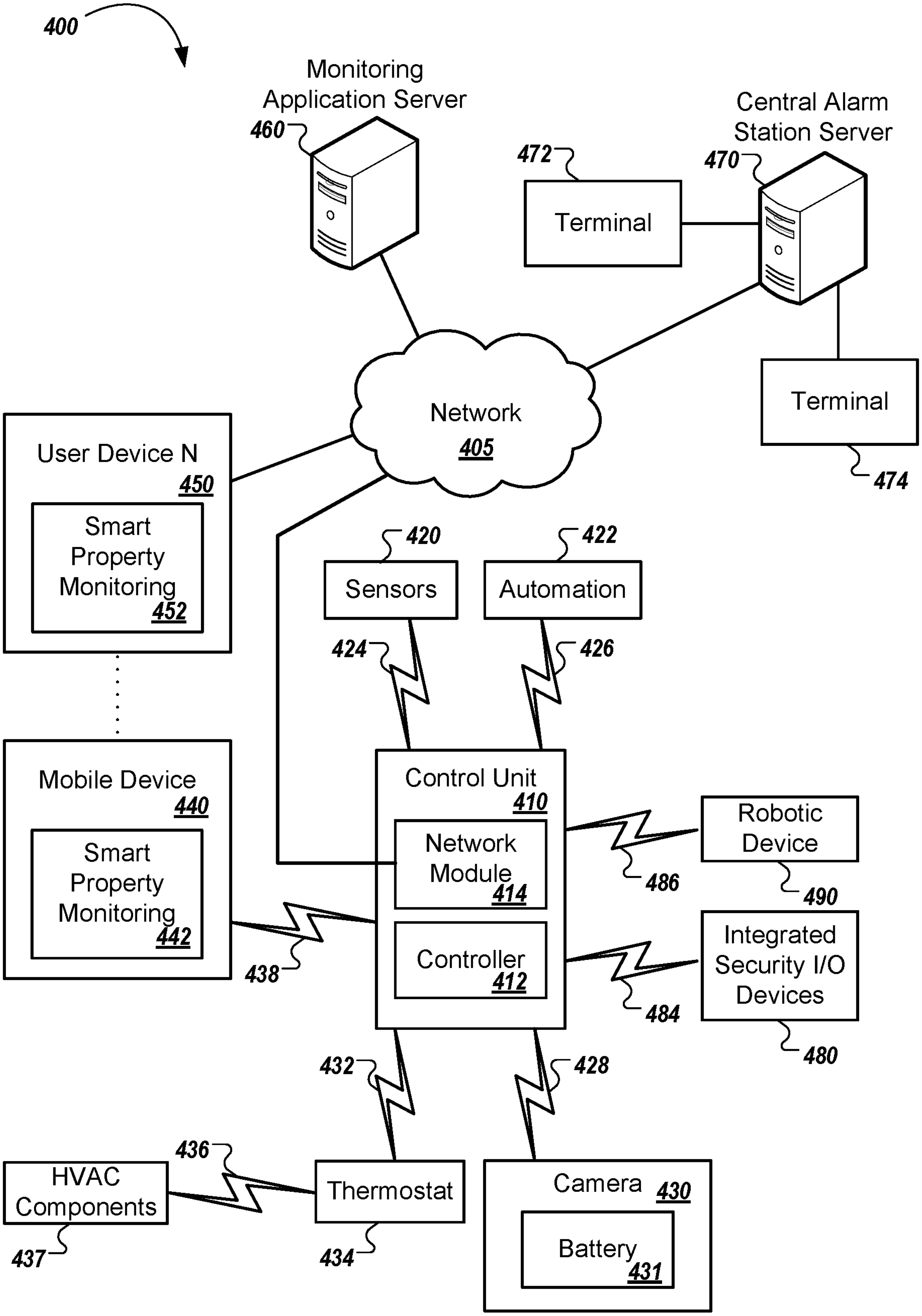
FIG. 4 is a diagram illustrating an example of a property monitoring system.

FIG. 4 is a diagram illustrating an example of a property monitoring system 400. The property monitoring system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 420 can include a radio-frequency identification (RFID) sensor that identifies a particular article that includes a pre-assigned RFID tag.

The control unit 410 communicates with the module 422 and a camera 430 to perform monitoring. The module 422 is connected to one or more devices that enable property automation, e.g., home or business automation. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol). Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430. The camera 430 can include one or more batteries 431 that require charging.

A drone 490 can be used to survey the electronic system 400. In particular, the drone 490 can capture images of each item found in the electronic system 400 and provide images to the control unit 410 for further processing. Alternatively, the drone 490 can process the images to determine an identification of the items found in the electronic system 400.

The camera 430 may be a video/photographic camera or other type of optical sensing device configured to capture images. For instance, the camera 430 may be configured to capture images of an area within a property monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more module 422.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in security monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a property charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the property. The robotic devices 490 may be configured to navigate to the charging stations after completion of tasks needed to be performed for the property monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the property monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the module 422, the camera 430, the thermostat 434, and the integrated security devices 480 may communicate with the controller 412 over communication links 424, 426, 428, 432, 438, 484, and 486. The communication links 424, 426, 428, 432, 438, 484, and 486 may be a wired or wireless data pathway configured to transmit signals from the sensors 420, the module 422, the camera 430, the thermostat 434, the drone 490, and the integrated security devices 480 to the controller 412. The sensors 420, the module 422, the camera 430, the thermostat 434, the drone 490, and the integrated security devices 480 may continuously transmit sensed values to the controller 412, periodically transmit sensed values to the controller 412, or transmit sensed values to the controller 412 in response to a change in a sensed value. In some implementations, the drone 490 can communicate with the monitoring application server 460 over network 405. The drone 490 can connect and communicate with the monitoring application server 460 using a Wi-Fi or a cellular connection.

The communication links 424, 426, 428, 432, 438, 484, and 486 may include a local network. The sensors 420, the module 422, the camera 430, the thermostat 434, the drone 490 and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 410. In this example, the monitoring application server 460 may exchange electronic communications with the network module 414 included in the control unit 410 to receive information regarding events (e.g., alerts) detected by the control unit 410. The monitoring application server 460 also may receive information regarding events (e.g., alerts) from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system 400 and perform analysis of sensor and image data received from the monitoring system 400. Based on the analysis, the monitoring application server 460 may communicate with and control aspects of the control unit 410 or the one or more user devices 440 and 450.

The monitoring application server 460 may provide various monitoring services to the system 400. For example, the monitoring application server 460 may analyze the sensor, image, and other data to determine an activity pattern of a resident of the property monitored by the system 400. In some implementations, the monitoring application server 460 may analyze the data for alarm conditions or may determine and perform actions at the property by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440 and 450 are devices that host and display user interfaces. For instance, the user device 440 is a mobile device that hosts or runs one or more native applications (e.g., the smart property application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart property application 442. The smart property application 442 refers to a software/firmware program running on the corresponding mobile device that enables the user interface and features described throughout. The user device 440 may load or install the smart property application 442 based on data received over a network or data received from local media. The smart property application 442 runs on mobile devices platforms, such as iPhone, iPod touch, Blackberry, Google Android, Windows Mobile, etc. The smart property application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart property user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the module 422, the camera 430, and the robotic devices, e.g., that can include the drone 490. The one or more user devices 440 and 450 receive data directly from the sensors 420, the module 422, the camera 430, and the robotic devices and send data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:

providing image frames of a scene for which the image frames were captured over a period of time, as an input to a machine learning model previously trained using a ground truth temporally aggregated optical flow signature, wherein the ground truth temporally aggregated optical flow signature was generated by applying a temporal smoothing filter on inter-frame optical flow data generated from training image frames of an input scene, and the ground truth temporally aggregated optical flow signature comprises a ground truth two-dimensional (2D) motion vector for a plurality of ground truth locations in the training image frames of the input scene;

obtaining, as an output from the machine learning model, a temporally aggregated optical flow signature that comprises a 2D motion vector for a plurality of locations in the image frames of the scene;

detecting, using the temporally aggregated optical flow signature, a real-motion event by comparing a magnitude of each 2D motion vector with a threshold; and performing an action for the real-motion event in response to detecting the real-motion event.

2. The method of claim 1, wherein the real-motion event comprises a spatiotemporally coherent motion of an inanimate or undefined object.

3. The method of claim 1, wherein the image frames of the scene comprise multiple pairs of consecutive image frames, and obtaining the temporally aggregated optical flow signature comprises:

for each pair of consecutive image frames, generating inter-frame optical flow data between two consecutive image frames in the pair; and determining the temporally aggregated optical flow signature using a combination of the inter-frame optical flow data for the multiple pairs of consecutive image frames.

4. The method of claim 1, comprising computing a traversal score using a location of an object over the period of time.

5. The method of claim 1, comprising:

detecting one or more objects in the image frames comprising determining one or more locations and one or more object types of the one or more objects;

determining whether a region corresponding to the real-motion event does not overlap with the one or more locations of the one or more objects; and in response to determining that the region corresponding to the real-motion event does not overlap with the one or more locations of the one or more objects, associating an undefined object type with the real-motion event.

6. The method of claim 1, wherein performing the action for the real-motion event comprises generating an event notification for the real-motion event.

7. A non-transitory computer storage medium encoded with instructions that, when executed by one or more computers, cause the one or more computers to perform operations comprising:

obtaining one or more training inputs for use training a machine learning model configured to receive as an input, input image frames of an input scene and to process the input to generate a predicted temporally aggregated optical flow signature that comprises a two-dimensional motion vector for a plurality of locations in the input image frames of the input scene, wherein each training input comprises training image frames of a scene for which the training image frames were captured over a period of time;

for each training input, generating inter-frame optical flow data from the training image frames using an optical flow algorithm;

generating a ground truth temporally aggregated optical flow signature by applying a temporal smoothing filter on the inter-frame optical flow data, wherein the ground truth temporally aggregated optical flow signature comprises a ground truth two-dimensional motion vector for a plurality of ground truth locations in the training image frames of the scene; and processing the training input using the machine learning model to generate a training predicted temporally aggregated optical flow signature; and training the machine learning model using a loss function that measures a difference between the ground truth temporally aggregated optical flow signature and the training predicted temporally aggregated optical flow signature.

8. The computer storage medium of claim 7, wherein the one or more training inputs comprise images of spatiotemporally coherent motion of an inanimate or undefined object.

9. The computer storage medium of claim 7, wherein for each training input, generating the ground truth temporally aggregated optical flow signature comprises:

obtaining, using a semantic scene segmentation algorithm, one or more scene entities in each training input;

determining that a first scene entity of the one or more scene entities has spatiotemporally coherent motion; and generating the ground truth temporally aggregated optical flow signature for the first scene entity using a real-motion flow vector of the first scene entity.

10. The computer storage medium of claim 9, the operations comprise:

determining that a second scene entity of the one or more scene entities has spurious motion; and setting the ground truth temporally aggregated optical flow signature for the second scene entity to zero.

11. The computer storage medium of claim 7, the operations comprise:

after training the machine learning model, providing, as a target input to the trained machine learning model, target image frames of a scene for which the target image frames were captured over a target period of time;

obtaining, as a target output from the trained machine learning model, a target temporally aggregated optical flow signature that comprises a target two-dimensional (2D) motion vector for a plurality of target locations in the target image frames of the scene;

detecting, using the target temporally aggregated optical flow signature, a target real- motion event by comparing a magnitude of each 2D motion vector with a threshold; and performing an action for the target real-motion event in response to detecting the target real-motion event.

12. The computer storage medium of claim 7, wherein the machine learning model comprises (i) a base neural network, (ii) a first head to generate the training predicted temporally aggregated optical flow signature, and (iii) a second head to generate an object type of a detected real-motion event.

13. A system comprising one or more computers and one or more storage devices on which are stored instructions that are operable, when executed by the one or more computers, to cause the one or more computers to perform operations comprising:

providing, image frames of a scene for which the image frames were captured over a period of time, as an input to a machine learning model previously trained using a ground truth temporally aggregated optical flow signature, wherein the ground truth temporally aggregated optical flow signature was generated by applying a temporal smoothing filter on inter-frame optical flow data generated from training image frames of an input scene, and the ground truth temporally aggregated optical flow signature comprises a ground truth two-dimensional (2D) motion vector for a plurality of ground truth locations in the training image frames of the input scene;

obtaining, as an output from the machine learning model, a temporally aggregated optical flow signature that comprises a 2D motion vector for a plurality of locations in the image frames of the scene;

detecting, using the temporally aggregated optical flow signature, a real-motion event by comparing a magnitude of each 2D motion vector with a threshold; and performing an action for the real-motion event in response to detecting the real-motion event.

14. The system of claim 13, wherein the real-motion event comprises a spatiotemporally coherent motion of an inanimate or undefined object.

15. The system of claim 13, wherein the image frames of the scene comprise multiple pairs of consecutive image frames, and obtaining the temporally aggregated optical flow signature comprises:

for each pair of consecutive image frames, generating inter-frame optical flow data between two consecutive image frames in the pair; and determining the temporally aggregated optical flow signature using a combination of the inter-frame optical flow data for the multiple pairs of consecutive image frames.

16. The system of claim 13, the operations comprise computing a traversal score using a location of an object over the period of time.

17. The system of claim 13, the operations comprise:

detecting one or more objects in the image frames comprising determining one or more locations and one or more object types of the one or more objects;

determining whether a region corresponding to the real-motion event does not overlap with the one or more locations of the one or more objects; and in response to determining that the region corresponding to the real-motion event does not overlap with the one or more locations of the one or more objects, associating an undefined object type with the real-motion event.

18. The system of claim 13, wherein performing the action for the real-motion event comprises generating an event notification for the real-motion event.

19. The system of claim 13, the operations comprise training the machine learning model, comprising:

obtaining one or more training inputs for use training the machine learning model, wherein each training input comprises the training image frames of the input scene for which the training image frames were captured over a period of time;

for each training input, generating the inter-frame optical flow data from the training image frames using an optical flow algorithm;

generating the ground truth temporally aggregated optical flow signature by applying the temporal smoothing filter on the inter-frame optical flow data; and processing the training input using the machine learning model to generate a training predicted temporally aggregated optical flow signature; and training the machine learning model using a loss function that measures a difference between the ground truth temporally aggregated optical flow signature and the training predicted temporally aggregated optical flow signature.

20. The system of claim 19, wherein for each training input, generating the ground truth temporally aggregated optical flow signature comprises:

obtaining, using a semantic scene segmentation algorithm, one or more scene entities in each training input;

determining that a first scene entity of the one or more scene entities has spatiotemporally coherent motion; and generating the ground truth temporally aggregated optical flow signature for the first scene entity using a real-motion flow vector of the first scene entity.

* * * * *